(12) United States Patent
Williams et al.

(10) Patent No.: US 10,949,748 B2
(45) Date of Patent: Mar. 16, 2021

(54) DEEP LEARNING OF BOTS THROUGH EXAMPLES AND EXPERIENCE

(71) Applicant: Microsoft Technology Licensing, LLC, Redmond, WA (US)

(72) Inventors: Jason Williams, Seattle, WA (US); Geoffrey Zweig, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1191 days.

(21) Appl. No.: 15/154,017

(22) Filed: May 13, 2016

(65) Prior Publication Data

US 2017/0330077 A1 Nov. 16, 2017

(51) Int. Cl.
*G06N 3/08* (2006.01)
*G06N 3/04* (2006.01)
*G06F 40/295* (2020.01)

(52) U.S. Cl.
CPC .......... *G06N 3/088* (2013.01); *G06F 40/295* (2020.01); *G06N 3/04* (2013.01); *G06N 3/0427* (2013.01)

(58) Field of Classification Search
CPC ..... G10L 15/063; G10L 15/16; G10L 15/183; G10L 15/22; G10L 17/22; G06F 17/30424; G06F 17/30654; G06F 17/30976; G06F 9/453; G06N 99/005; G06N 3/008; G06N 3/0454; G06N 3/088
See application file for complete search history.

(56) References Cited

U.S. PATENT DOCUMENTS

| 8,954,319 B2 | 2/2015 | Williams | |
|---|---|---|---|
| 2011/0153711 A1* | 6/2011 | Farver | G06F 8/71 709/201 |

(Continued)

FOREIGN PATENT DOCUMENTS

| WO | 2013010262 A1 | 1/2013 |
|---|---|---|
| WO | 2016040769 A1 | 3/2016 |

OTHER PUBLICATIONS

Traum, David, Speech Acts for Dialogue Agrents (excerpt from Foundations of Rational Agency), 1999. (Year: 1999).*

(Continued)

*Primary Examiner* — Kamran Afshar
*Assistant Examiner* — Marshall L Werner (57) ABSTRACT

Embodiments include methods and systems for using, creating and maintaining goal-oriented, dialog systems (i.e., transactional bots) that provide interfaces to application functionality. The methods and systems of the embodiments provide a bot that may learn in supervised learning and reinforcement learning from conversational examples provided by domain experts and from interaction with users. Conversational bots may be created to interact using both text and/or application programming interface (API) calls. A developer may configure a bot that interfaces with an application back-end where behavior of the bot may be controlled by use of masking actions. A specification for the bot may be flexibly designed to specify how developer code may be organized, for example, as masking operations on the possible actions the bot may execute. Additionally, the methods and systems may automatically infer the best state representation during a dialog so a state variable need not be predefined.

22 Claims, 5 Drawing Sheets

(56) References Cited

U.S. PATENT DOCUMENTS

| | | | |
|---|---|---|---|
| 2012/0041903 | A1 | 2/2012 | Beilby et al. |
| 2013/0124435 | A1 | 5/2013 | Estes |
| 2014/0279050 | A1 | 9/2014 | Makar et al. |
| 2017/0154261 | A1* | 6/2017 | Sunehag .................. G06N 3/08 |

OTHER PUBLICATIONS

Wen et al., A Network-based End-to-End Trainable Task-oriented Dialogue System, pp. 1-11, Apr. 2016. (Year: 2016).*

Su et al., Learning from Real Users: Rating Dialogue Success with Neural Networks for Reinforcement Learning in Spoken Dialogue Systems, Aug. 2015. (Year: 2015).*

Brownlee, Jason, How to Prepare Data for Machine Learning, https://machinelearningmastery.com/how-to-prepare-data-for-machine-learning/, Dec. 2013. (Year: 2013).*

Su et al., Learning from Real Users: Rating Dialogue Success with Neural Netowrks for Reinforcement Learning in Spoken Dialogue Systems, Aug. 2015. (Year: 2015).*

Henderson et al., Hybrid Reinforcement/Supervised Learning of Dialogue Policies from Fixed Data Sets, Computational Linguistics, vol. 34, No. 4, pp. 487-511, 2008. (Year: 2008).*

Sunehag, Peter Goran, U.S. Appl. No. 62/261,781 Specification, Provisional of U.S. Appl. No. 15/367,094, Dec. 2015. (Year: 2015).*

Wen et al., A Network-based End-to-End Trainable Task-oriented Dialogue System, pp. 1-11, Apr. 15, 2016. (Year: 2016).*

Williams, et al., "The Dialog State Tracking Challenge Series: A Review", In Journal of Dialogue & Discourse, vol. 7, Issue 3, Apr. 1, 2016, pp. 4-33.

"International Search Report and Written Opinion Issued in PCT Application No. PCT/US2017/031460", dated Aug. 21, 2017, 14 Pages.

Lowe, et al., "The Ubuntu Dialogue Corpus: A Large Dataset for Research in Unstructured Multi-Turn Dialogue Systems", Retrieved from <<https://arxiv.org/pdf/1506.08909.pdf>>, Feb. 4, 2016, 10 Pages.

Wen, et al., "A Network-based End-to-End Trainable Task-oriented Dialogue System", Retrieved from <<https://arxiv.org/pdf/1604.045620.pdf>>, Apr. 15, 2016, 11 Pages.

"Bot Engine", Published on: Apr. 29, 2016 Available at: https://wit.ai/blog.

Serban, et al., "Building End-To-End Dialogue Systems Using Generative Hierarchical Neural Network Models", In Proceedings of the Thirtieth AAAI Conference on Artificial Intelligence, Feb. 12, 2016, pp. 3776-3781.

"Deep Learning for Chatbots, Part 1—Introduction", Published on: Apr. 6, 2016 Available at: http://www.wildml.com/2016/04/deep-learning-for-chabbots-part-1-introduction/.

Shilovistsky, Oleg., "Future PLM Assistant Bots Will Help to Manage Eco", Published on: Nov. 5, 2015 Available at: http://beyondplm.com/2015/11/05/future-plm-assistant-bots-will-help-to-manage-eco/.

Jingli, et al., "Building a Hybrid: Chatterbot—Dialog System", In Proceedings of 16th International Conference on Text, Speech, and Dialogue, Sep. 1, 2013, 4 pages.

Hinchcliffe, Dion., "How Chatbots and Artificial Intelligence Are Evolving the Digital/Social Experience", Published on: Apr. 16, 2016 Available at: https://flipboard.com/@joelpope/algorithms-9anfo8skz/how-chatbots-and-artificial-intelligence-are-evolving-the-digital%2Fsocial-experie/a-bfElmHI7SrWzd31CA9n-Mg%3Aa%3A270592896-90b96720ff%2Fdionhinchcliffe.com.

Elagizy., "Developing AI chatbots", Published on: Nov. 26, 2005 Available at: http://www.codeproject.com/Articles/12454/Developing-AI-chatbots.

Wagner, Kurt., "Facebook's Virtual Assistant 'M' Is Super Smart. It's Also Probably a Human", Published on: Nov. 3, 2015 Available at: http://www.recode.net/2015/11/3/11620286/facebooks-virtual-assistant-m-is-super-smart-its-also-probably-a-human.

Vinyals, et al., "A Neural Conversational Model", In Proceedings of the 31st International Conference on Machine Learning, Jul. 10, 2015, 8 pages.

Koebler, Jason., "Google's New Chatbot Taught Itself to Be Creepy", Published on: Jun. 22, 2015 Available at: http://motherboard.vice.com/read/googles-new-chatbot-taught-itself-to-be-creepy.

"Language Understanding Intelligent Service (beta)", Retrieved on: May 11, 2016 Available at: https://www.luis.ai.

Oshry, et al., "Voice Extensible Markup Language (VoiceXML) 2.1", Published on: Jun. 19, 2007 Available at: https://www.w3.org/TR/2007/REC-voicexml21-20070619/.

Lee, et al., "Example-based dialog modeling for practical multi-domain dialog system", In Journal of Speech Communication, vol. 51, Issue 5, May 2009, pp. 466-484.

Hurtado, et al., "A Stochastic Approach to Dialog Management", In Proceedings of IEEE Workshop on Automatic Speech Recognition and Understanding, Nov. 27, 2005, 6 pages.

Young, et al., "POMDP-based Statistical Spoken Dialogue Systems: a Review", In Proceedings of the IEEE, Jan. 2012, pp. 1-18.

* cited by examiner

DEEP LEARNING OF BOTS THROUGH EXAMPLES AND EXPERIENCE

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure include methods and systems for using, creating and maintaining goal-oriented, dialog systems (i.e., "transactional bots" or "bots") that provide interfaces to application functionality such as, for example, interfaces to application functionality for ordering a taxi, controlling devices in the home, banking, or shopping. The methods and systems of the embodiments provide a bot that may learn in supervised learning and reinforcement learning from conversational examples provided by domain experts and from interaction with users. The embodiments provide conversational bots that may be created to interact using both text and/or application programming interface (API) calls. Use of the embodiments allows a developer to configure a bot that interfaces with an application back-end and allows the behavior of the bot to be configured by use of masking actions. Use of the embodiments also allows flexible design of a specification for the bot that specifies how developer code may be organized, for example, as masking operations on the possible actions the bot may execute. Additionally, the methods and systems may automatically infer the best state representation during a dialog so a state variable need not be predefined.

In an embodiment the methods and systems may be implemented as a bot using a Long Short-Term memory (LSTM) recurrent neural network model. The LSTM recurrent neural network may be optimized with supervised learning and/or using reinforcement learning via a specialized policy gradient method. In the implementation bot behavior may be specified with example dialogs. Bot behavior also may be improved autonomously from interactions with users without human intervention using a controller that makes use of business rules to gate exploration.

An example implementation may comprise a system including one or more processors that control an interactive dialog with a user. The system may include memory that includes programs or code, that when executed, causes the one or more processors to control the system to perform entity extraction on input text generated from a user input. The user input may generate the text directly from text input by a user or generate the text by converting audio input from a user into text. The entity extraction may identify entities in the text using custom models for specific domains or generic models suitable for use with multiple domains. The system may determine marked-up text from the input text and use the marked up text to determine a mask over available actions. The mask may comprise an indication of which actions of a set of actions are allowed and disallowed. The system may then provide the mask and a set of features to a recurrent neural network. The set of features may include the input text generated from the user input and the indications of types of entities extracted in the entity extraction. The system may then receive an indication of a selected action from the recurrent neural network, update an internal state in the system based on the indication of the selected action, and initiate the selected action for the dialog.

In the implementation, the system and recurrent neural network may perform operations in a loop type behavior while the interactive dialog occurs by varying the configuration of the set of features provided to the recurrent neural network. For example, the system may include features generated by the system, features returned from an API call (if the previous action was an API call), or an indication of a previous action taken by the system (if there was a previous action), when providing the set of features to the recurrent neural network.

Another example implementation the system may include one or more processors that control a supervised learning process. The system may include memory that includes programs or code, that when executed, causes the one or more processors to control the system to receive one or more sample dialogs created by a developer, determine if any action in the one or more sample dialogs is masked out, and, in response to a determination that no action in the one or more sample dialogs is masked out, incorporate the one or more sample dialogs into a training set. The system may also create a log including a set of features and entity extractions for the training. The system may then apply training to a recurrent neural network using the training set and the log, score the one or more sample dialogs using the recurrent neural network to generate a score result based on the training, and, determine if a target action in the one or more sample dialogs was not assigned a highest probability in the score result. The determination of whether a target action was not assigned a highest probability may then be used to further refine the training. For example, if it is determined that a target action in the one or more sample dialogs was not assigned a highest probability in the score result, the system may provide an indication of a dialog of the one or more sample dialogs in which the target action was not assigned a highest probability to the developer. If it is determined that each target action in the one or more sample dialogs was assigned a highest probability in the score result, the system may provide an indication that all of the one or more sample dialogs were reconstructed successfully to the developer.

In a further example implementation the system may include one or more processors that control a reinforcement learning process. The system may include memory that includes programs or code, that when executed, causes the one or more processors to control the system to receive a definition for a reward signal and a return for one or more dialogs, perform the one or more dialogs using a recurrent neural network, create a log of rewards, features, available actions, and selected actions from the performed one or more dialogs, provide the return for the performed one or more dialogs to the neural network for use in improvement of the neural network, and provide the log for output at a user interface.

DETAILED DESCRIPTION

The system and method will now be described by use of example embodiments. The example embodiments are presented in this disclosure for illustrative purposes, and not intended to be restrictive or limiting on the scope of the disclosure or the claims presented herein.

The disclosed embodiments provide a technical advantage as compared to currently used methods for using and creating transactional bots (bots) for dialog systems. The embodiments provide a system that allows a neural network to be optimized both with supervised learning and using reinforcement learning via a specialized policy gradient method. In an implementation bot behavior may be specified with example dialogs. Bot behavior also may be improved autonomously from interactions with users without human intervention using a controller that reinforces business rules to gate exploration by the neural network. Additionally, use of the embodiments with a recurrent neural network allows inference of a latent representation of the state of the system.

Use of the embodiments provides an advantage over currently used rule-based methods. Rule languages used to define behavior in rule based systems are often not easy to use by non-experts. It is often difficult for a program manager, designer, or marketing executive to build or maintain a bot without support from a software developer expert in rules languages. Also, as the number of rules for defining a system grows, the rules begin to interact and, as a result, rule changes have unforeseen consequences, so fixing one bug can introduce many other bugs. This makes maintenance of non-trivial rule based systems slow and extremely difficult. Additionally, rule-based methods do not learn automatically from experience. Even if a bot conducts a million dialogs a day, no automatic improvement is possible. Improvements to bot behavior can only be made through time-consuming human analysis. Use of the embodiments of the disclosure allows bot behavior to be specified using example dialogs without the need to know a specialized rules language. For example, designers, program managers, or marketing executives may configure the system without help from specialized software developers who know the rules language. Use of the embodiments also allows bot behavior to be improved autonomously through interactions with users without human intervention. The embodiments also provide the advantage that exploration performed by a neural network can be gated or restricted in scope by optional code that enforces rules for bot behavior.

The capability of the embodiments for bot behavior to be improved autonomously through interactions with users of the embodiments also provides an advantage over currently used supervised learning (SL) methods. In SL, a domain expert provides example dialogs that the bot should imitate, and a machine learning algorithm ingests these and builds a model which attempts to generalize to new dialogs. SL methods do not have the ability to make improvements automatically through experience or through reinforcement learning. In order to make improvements in bot behavior, a domain expert must manually examine and label dialogs.

The capability of the embodiments of the disclosure to infer a latent representation of state without the need to manually define the state also provides an advantage over currently used supervised learning SL methods. Current SL methods require the careful design of a "state" variable, which the SL algorithm uses as the basis for choosing actions. Design of the state variable is problematic. Including too little information in the state variable definition prevents the SL algorithm from successfully learning to reconstruct the example dialogs. Including too much information in the state variable definition causes over-fitting or narrowing of behavior, which means the bot will not generalize to new situations. In the embodiments, use of a recurrent neural network allows inference of a latent representation of state. This inference of state substantially reduces the effort developers need to put into hand-engineering the state required by current SL methods.

Also, current SL methods do not allow actions to be masked by a developer. The capability of the embodiments to mask actions allows support of business logic, such as only allowing an action like transferring funds after an action confirming the transfer with the user has succeeded.

The embodiments of the disclosure also provide advantages over currently used reinforcement learning (RL) methods in which an RL algorithm explores different actions in different states, and over time makes progress toward finding the mapping from state to action that maximizes a reward signal. RL learns automatically, without input from system designers. RI systems are difficult to create and, typically, for the first 100s or 1000s of dialogs, RL systems usually perform very badly because an RL system explores all possible actions, including spurious actions. In the embodiments of the disclosure the capability to gate exploration using optional code that enforces business rules may be used to prevent exploration of spurious actions and improve system behavior as compared to the current RL systems. Also, in an RL system, as with an SL system, careful definition of the state variable is needed. The embodiments of the disclosure remove the need to define the state variable that is present in current RL systems.

Figure 1:
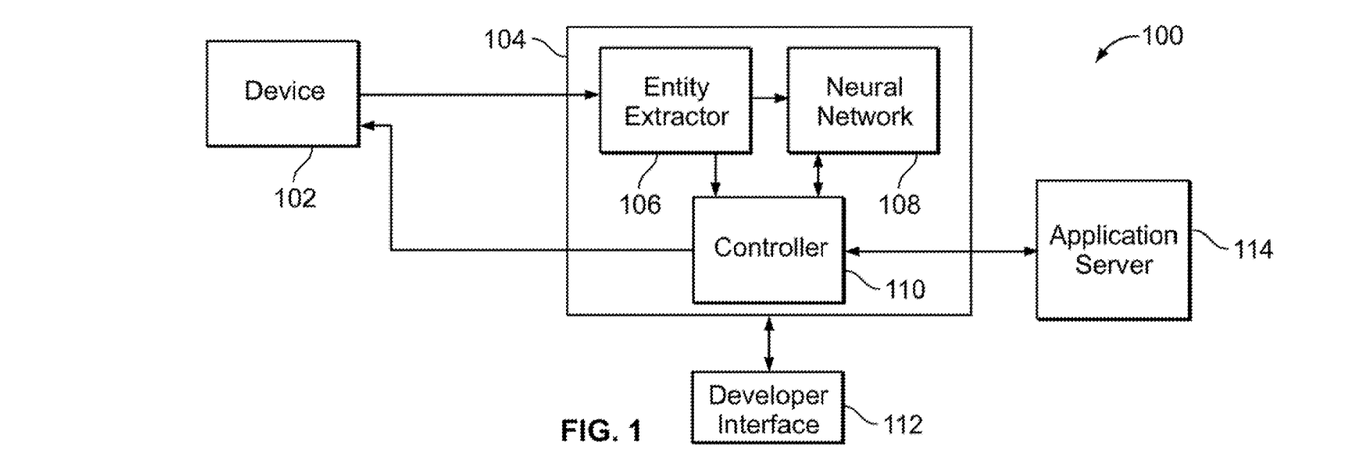
FIG. 1 is a simplified block diagram illustrating example functions according to an embodiment of the disclosure.

Referring now to FIG. 1, therein is a simplified block diagram illustrating example functions according to an embodiment of the disclosure. FIG. 1 illustrates functional blocks of an example network 100 including an example system 104. In the example implementations system 104 may implement functionality for a bot and include entity extractor 106, recurrent neural network 108, and controller 110. System 104 may also include a developer interface 112.

System 104 may interact with device 102 and application server 114. Device 102 may include an application that allows a user to interact with and receive services from application server 114 through system 104. System 104 may communicate with a user of device 102 via one or more channels. The one or more channels may be any type of communication channels carrying communications for applications including short messaging services (SMS), email services, messaging platforms such as conferencing platforms, social network platforms, text messaging platforms, or any other type of application using text communication. The applications may also include any type of application using voice or spoken communications, or web browsers. In various implementations text may be typed in by the user, or transcribed text produced by a speech recognizer, or, also may be translated from another language using an automatic translation service. The user could engage in a one to one dialog with the bot, or the bot could be participating in a dialog with a plurality of users. The bot could be addressed directly, or the bot could monitor a conversation and respond when it determines a response would be relevant.

The applications may include, for example, reservation applications, retail/purchasing applications, information retrieval applications, or any other type of application that may interact with a user through a dialog. Device 102 may be any type of device configured to allow a user to use an application such as, for example, a smartphone, a tablet computer, a desktop computer, laptop computer device, gaming devices, media devices, smart televisions, multimedia cable/television boxes, smart phone accessory devices, industrial machinery, home appliances, thermostats, tablet accessory devices, personal digital assistants (PDAs), or other internet of things (IOT) devices. The functions of entity extractor 106, recurrent neural network 108 and controller 110 of system 104 may be implemented using one or more servers. In alternative embodiments of FIG. 1, the functions described for a particular functional block in relation to FIG. 1 may be performed in another of the functional blocks of FIG. 1 or divided up between the functional blocks in a different way.

Figure 2:
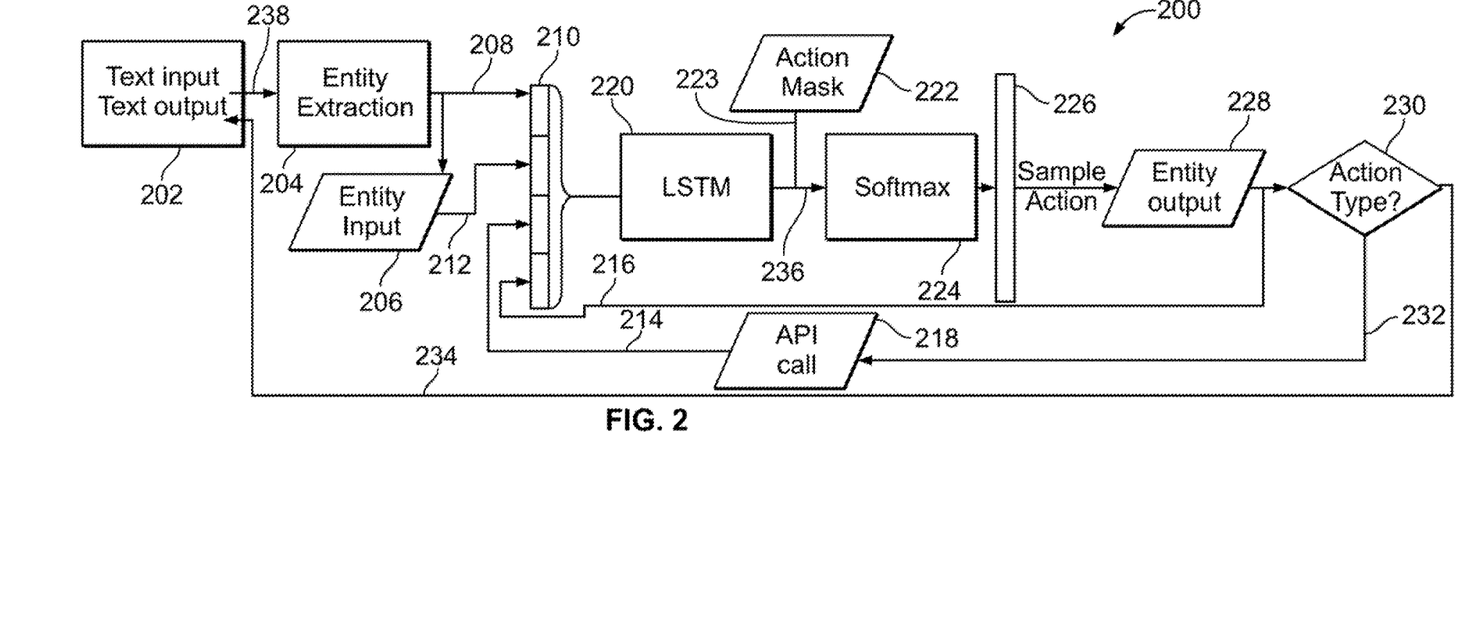
FIG. 2 is a flow diagram illustrating example signal flows between functional blocks of an operational loop in an implementation according to FIG. 1.

Referring now to FIG. 2, therein is a flow diagram illustrating example signal flows for data exchange between functions of an operational loop 200 in an implementation according to FIG. 1. The functions of FIG. 1 may be described with reference to FIG. 2. Block text input/text output 202 may represent functions performed at device 102, blocks entity input 206, action mask 222, entity output 228, and API call 218, may represent function performed by controller 110, and block entity extraction 204 may represent functions performed at entity extractor 106. Long short-term memory recurrent neural network (LSTM) may represent functions performed at recurrent neural network 108. Softmax 224 represents a conversion of LSTM 220 output values (provided via signal 236) into action probabilities for communication to controller 110 via block 226.

The process begins when device 102 provides a text input signal 238 to entity extractor 106. At 204, entity extraction is performed and entities are identified in the text. For example, in the query "Will it rain in Sacramento on Friday?", entity extraction at 204 may identify "Sacramento" as a city, "Friday" as a day, and "rain" as a weather event. The entity extraction of 204 may also use custom models specific to the user's domain, or may use generic models suitable for many domains. For example, generic models may extract entities such as dates, times, locations, monetary amounts, etc. the entity extraction at 204 may optionally resolve entities to a machine interpretable form. For example, "January" might be resolved to "month=1".

Next, entity extractor 106 sends signal 208 to pass marked up text at 206 to the controller 110. Entity extractor 106 may also pass the input text and entities to recurrent neural network 108 through signal 208 at block 210. Controller 110 is configured to perform a defined set of operations and the developer may be further guided in what to write through the user-interface design. The controller 110 may resolve the text of entities to ontology within the domain of a particular application. For example, it might resolve the user's input of "town car" to a canonical indication like "CAR_TYPE=UBER_LIVERY". The controller 110 code may also maintain its own internal state, for example, tracking entities that have been input or output over the course of the dialog. Controller 110 implemented in a variety of ways, including as a web service (e.g. in C# or node.js), or run locally.

The controller 110 may optionally return a "mask" over actions, i.e., an indication of which actions in the text are allowed and disallowed at action mask 222 through signal 223 to recurrent neural network 108. The code may also optionally return other features at block 210 which can be used by recurrent neural network 108. The other features input to neural network by signals 214 and 216 depend on whether any previous operations were performed in the loop 200 and what those operations were. When controller 110 returns an indication of which actions are available, the list of actions returned may include wildcards. For example, the indication of available actions may indicate that any text output action is allowed with a wildcard indication for text output, but only certain API calls are allowed.

Masking in the masking over available actions may take into account which entity types are available to controller 110. For example, if the entity for "DEPARTURE_CITY" hasn't been received, actions that ask the user to confirm "DEPARTURE_CITY" (like "Leaving from Boston, is that right?") may be masked out. If controller 110 returns additional features to neural network 108, these can be implemented as a programmatic dictionary, like {"estimated_wait_minutes": 10, "user_logged_in": false}

At block 210, the set of features is then passed to recurrent neural network 108 along with the mask over available actions, if provided at 222. The set of features may include the text of the user's input at 202, an indication of which entities or types of entities were detected at 204, features returned from the developer code at 206 via signal 212, features returned from an API call (if the previous action was an API call), and an indication of the previous system action taken (if a previous system action was taken). The features can also include other items from previous time steps, however, the stateful nature of the recurrent neural network should prevent the need to do this.

At 220, the recurrent neural network 108 performs the function of a LSTM recurrent neural network and generates a distribution over actions to take. The distribution may be based on the received set of features and a received mask over available actions. The output actions may be represented as a "flat" list, or as a generative process. For example, a generative process might use a second neural network which can generate text, along with the probability of that text.

The output actions may include references to entity types, such as "CAR_TYPE", without specific values populated (like "town car"). Using entity types in actions rather than entity values may substantially reduce the number of actions, and allow the system to generalize over entity values it has never seen before. This may be an advantage when an entity may take on many values, or when the possible values may change over time, such as "RESTAURANT_NAME" or "EMAIL_SUBJECT". These references may be populated, before they are output.

If the output actions are represented as a flat list, the mask may be implemented by multiplying the raw (unmasked) action probabilities by an array of 1s and 0s, with 1s for allowed actions and 0s for disallowed actions. This array may then be re-normalized so the non-zero actions sum to 1. The gradients of weights with respect to these masked outputs may be welt-defined, so gradient descent methods may be applied.

Recurrent neural network 108 then samples an action from the (masked) distribution of actions. The action may be sampled from the distribution in the traditional sense. This type of sampling may provide an advantage when exploring for reinforcement learning in the neural network, at the expense of some performance. In another implementation, the action with the maximum probability may be selected. This type sampling may provide an advantage for maximizing performance, at the expense of not exploring.

At block 228, the controller 110 is sent an indication of which action has been selected. Controller 110 may update its internal state at this point. Controller 110 may also send an indication of the selected action to recurrent neural network through signal 216 for use as a feature. If the chosen action contains references to entity types, they are populated by the developer code at 228. For example, DESTINATION_CITY in "Going to DESTINATION_CITY, is that right?" may be changed to "Seattle". The selected action, with entity substitution, is then executed.

At 230 the action type is determined. If the action is a textual action, it is output to the user as text output at 202 through signal 234. If the action is an API call, the API call is invoked at 218 through signal 232. The API call at 218 may optionally return features related to the API call to neural network 108 through signal 214. If the action is a special "LISTEN" action, control returns to 202 and the system waits for user input. Other special actions may be defined, such as "QUIT" (which causes the system to abandon the conversation), "ESCALATE" (which causes a human agent to step in on behalf of the agent). The special actions may be defined to include any other appropriate action.

In other implementations, the flow described above may be modified to allow for asynchronous input, for example, if the user types input while the system is waiting on a response from an API call, the system may queue up user input and execute the loop when user input is received. In embodiments, API calls may interact with external services, or may interact with the user. For example, an API call could show a map, picture, or contact card to the user.

Following is a simple example of the type of dialog sequence that is possible with this loop:

How can I help you?
"Call Jason at his home"
[API call to look up phone numbers]
Sorry, I don't have a home number for Jason Williams. I have mobile or work.
Which would you like?
"Mobile"
Calling Jason Williams, mobile.
[API call to choose mobile phone number]
[API call to place telephone call]

Figure 3:
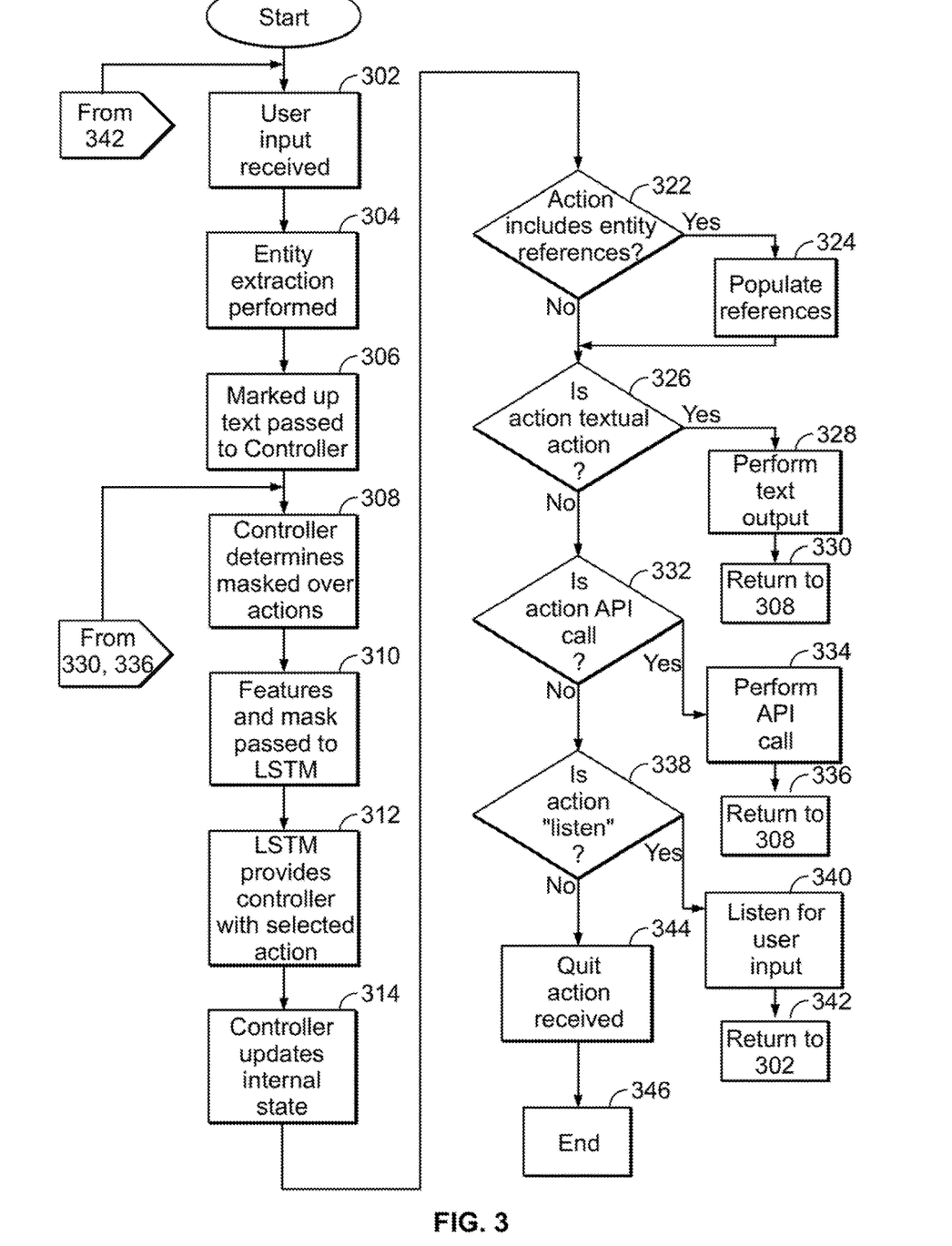
FIG. 3 is a flow diagram illustrating runtime operations performed by an example system.

Referring now to FIG. 3, is a flow diagram illustrating runtime operations performed by example system 104. FIG. 3 illustrates operations performed by system 104 of FIG. 1 during execution of runtime loop 200. FIG. 3 is similar to FIG. 2 but shows operations in a linear manner.

The process begins at 302 where user input is received. At 304, entity extraction is performed on the user input by entity extractor 106. At 306, marked up text is passed to the controller 110. The input text and entities may also be passed to the recurrent neural network (LSTM). At 308, controller 110 determines the mask over actions, and at 310 the set of features and the mask are passed to the recurrent neural network 108. The set of features may include features as described for FIG. 2. At 312 the recurrent neural network 108 provides controller 110 with the selected action based on the set of features and the mask. At 314 controller 110 updates its internal state. Controller 110 may also send an indication of the selected action to recurrent neural network 108 for use as part of a feature set, or, if the selected action contains references to entity types, populate the references.

At 322, controller 110 determines if the selected action includes entity references. If the selected action includes entity references, controller 110 populates the references at 324 as was described in relation to FIG. 2 and moves to operation 326. If the selected action does not include entity references the process moves from 322 to 326.

At 326 it is determined if the selected action is a textual action. If the selected action is a textual action, at 328, controller 110 initiates the performance of text output at device 102 and returns to operation 308 at 330. If the selected action is not a textual action the process moves from 326 to 332.

At 332 it is determined if the selected action is an API call. If the selected action is an API call, at 334, controller 110 performs the appropriate API call. Controller 110 may also send an indication of the API call to recurrent neural network as part of the feature set. Next at 336 the process returns to operation 308. If the selected action is not an API call the process moves to 338.

At 338 it is determined if the selected action is a "listen" action. If the selected action is a listen action, the controller 110 initiates listening for user input at 340. When user input is received the process returns from 342 to 302.

If the selected action is not a listen action the process moves to 344 and determines a quit action was received. The process then ends at 346.

In alternative implementations, any number of actions may be defined for use in the process, and controller 110 may direct the process appropriately depending on which of the actions is selected.

Figure 4:
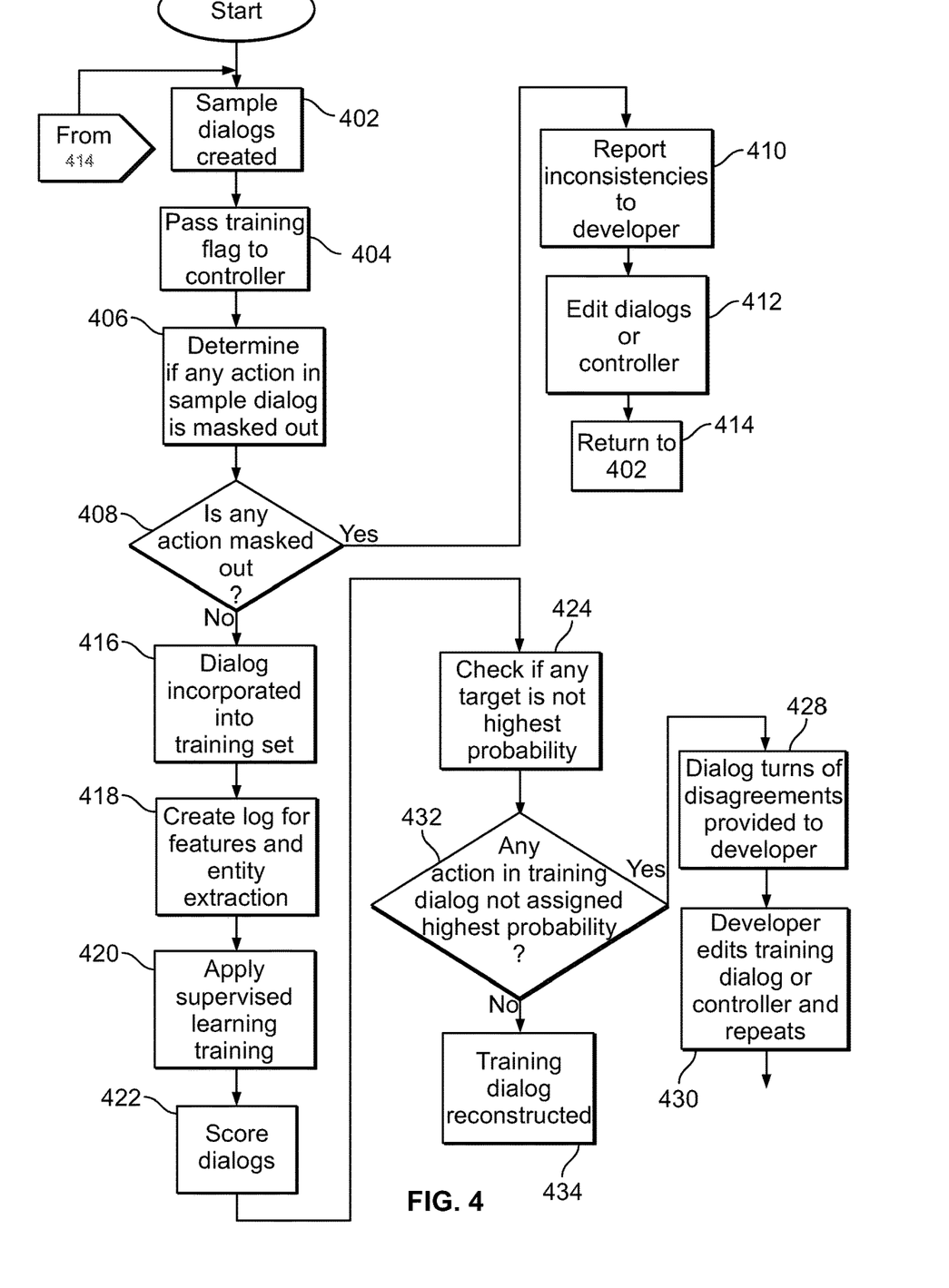
FIG. 4 is a flow diagram illustrating supervised learning operations performed by an example system.

Referring now to FIG. 4, therein is a flow diagram illustrating supervised learning operations performed by an example system according to the embodiments. The process of FIG. 4 may be performed for supervised learning operations in the system 104 of FIG. 1. The process of FIG. 4 may be used improved performance of system 104 by providing example dialogs, and training the recurrent neural network 108 to mimic the example dialogs.

The process begins at 402 where one or more sample dialogs are created. Because the embodiments do not use rule-based methods, the dialogs maybe created by persons who are non-experts in rules languages. For example, a domain expert such as a designer, program manager, marketing executive, or developer may create the one or more new sample dialogs. The sample dialogs may include an indication of where API calls are made and may be created in entirety by the domain expert through interaction with the current bot. The one or more sample dialogs also may be drawn from an existing corpus of interactions with real users or may be synthesized through interaction with a simulated user. The one or more sample dialogs may also be created by interacting with crowd workers, or taking existing dialogs and scrambling them.

At 404 a supervised learning training flag is passed to controller 110.

The run-time loop, which was described in relation to FIG. 2, is run on the one or sample dialogs in a modified loop form in performing the supervised learning (SL) of FIG. 4. In the modified loop, actions are not sampled, but rather, a check is done to see if each action in the sample dialog is masked out or not. At 406 the controller determines if any action in the one or more sample dialogs is masked out. At 408 if an action in the one or more sample dialogs is masked out the process moves to 410. If any action in the sample dialog is masked out, this means the dialog could not be produced with the existing developer code, i.e., the dialog is inconsistent with the developer code. At 410 the inconsistency is reported, for example, to the developer. The developer may then edit the dialogs or controller code at 412. The process may then return from 414 to 402 to begin again.

If at 408 no action in the one or more sample dialogs is masked out the process moves to 416. When no actions in the sample dialogs are masked out, this indicates the dialog may be produced by the existing developer code. In this case, the dialog is incorporated into the training set. In this modified loop, at 418, a log is created for the features reported by the developer code and entity extraction model. The log created at 418 may be used by the supervised learning algorithm in the SL training.

At 420 the SL training is then applied using recurrent neural network 108 and the entire corpus of training dialogs. The inputs are as described for the runtime loop of FIG. 2, and the target outputs are the actions which appear in the training dialogs.

The recurrent neural network 108 may use gradient descent to train the model. If the model is a distribution over a flat list of actions, categorical cross-entropy between the model output and the one-hot vector encoding of the target action may be used by the recurrent neural network as the loss function. After SL training is applied, at 422, all of the dialogs in the training corpus are then scored using the new sequence model. At 424, a check is then performed to see whether any of the target actions in the training dialogs were not assigned the highest probability by the model.

Next, at 432 if any action in a training dialog was not assigned the highest probability by the new sequence model, the disagreement indicates that the new sequence model has failed to re-construct the training dialogs and the process moves to 428. At 428, the dialog turns of any disagreement are provided to the developer. The developer may then resolve the disagreement at 430 by changing, deleting, or adding an example dialog in the training corpus, modifying the developer code, modifying the SE learning algorithm or parameters, or modifying the entity extraction model. If however if any action in a training dialog was not assigned the highest probability by the new sequence model, the process moves from 432 to 434. At 434, the developer may be provided with an indication that the new sequence model has successfully re-constructed the training dialogs. The SL learning cycle may then be repeated. At any time, the developer may "deploy" the trained bot, so it is available for interaction with users in the runtime loop.

Figure 5A:
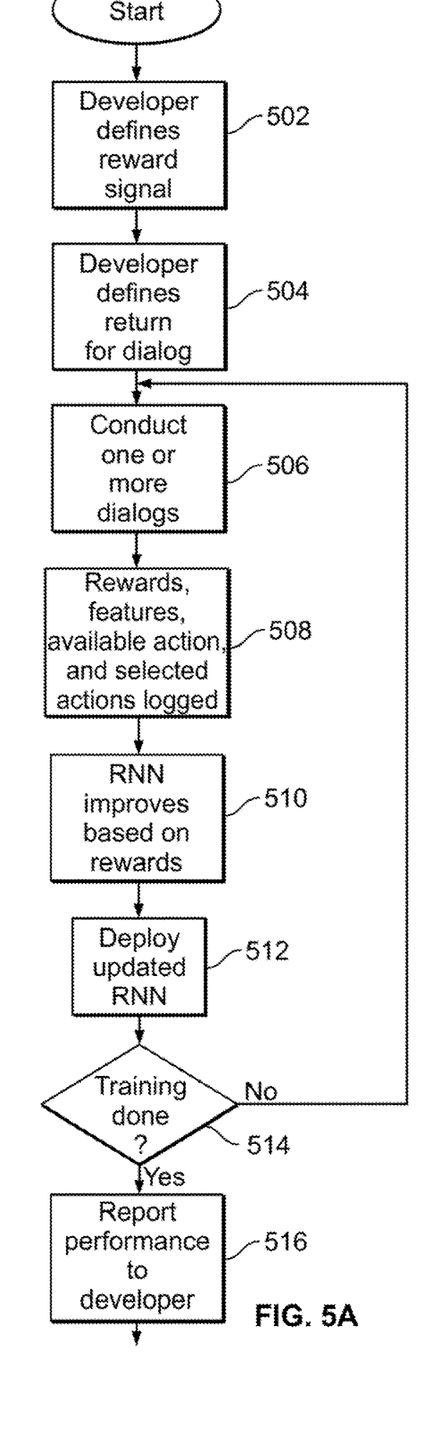
FIG. 5A is a flow diagram illustrating reinforcement learning operations performed by an example system.

In addition to SL training, use of the embodiments also allows the use of reinforcement learning (RL) training to improve performance of a bot. Referring now to FIG. 5A, therein is a flow diagram illustrating reinforcement learning operations performed by an example system. FIG. 5A shows operations to optimize performance of system 104 of FIG. 1 in the runtime loop of FIG. 2 through interaction with users, and adjustment of the model using reinforcement learning.

The process of FIG. 5A, begins at 502 where the developer defines a reward signal. The reward signal may be a real-valued number that indicates how "good" a system action is in a particular context. The rewards signal may be inferred from usage. For example, the signal may indicate whether the user achieved a desired task. The rewards signal may also be provided by the user providing an answer to a question at the end of a dialog such as "Did I do OK?" The reward signal may also be exogenous to the dialog, for example, whether the user later made a purchase sometime after the dialog completed. Alternately, the rewards signal may be provided by a labeler who examines dialogs and scores their quality. The reward signal may indicate a property of the whole dialog, a portion of a dialog, or a specific turn of dialog. For example, a reward at the end of the dialog might indicate a task completion for the whole dialog and a reward at a specific turn in the middle of a dialog might indicate the quality for that specific action.

At 504 the developer defines a return for the dialog. The overall return for the whole dialog may be a discounted sum of the rewards at each turn. The discount factor may be defined by the developer, or may be set to a standard value. For example the discount factor may be set to a value such as 0.95.

At 506, system 104 conducts a batch of dialogs. The batch may include one or more dialogs with one or more users. The users may be real users, crowd workers, or user simulations. At 508, the rewards, features, available actions, and actions selected from the batch are logged. At 510, recurrent neural network 108 makes improvements based on the rewards received during the batch. The improvement at 510 may be made using a policy gradient. Next, at 512 the recurrent neural network 108 is updated and deployed. At 514, it is determined if the training if finished. If the training is finished the process ends and performance is reported to the developer at 516. If the training is not finished the process moves back to 506 and continues conducting the training dialogs through the process of FIG. 5A until training is finished.

In an alternate embodiment, the batch of dialogs used for improvement may include dialogs collected in previous batches. In a further embodiment, some iterations of FIG. 5A may skip collecting new dialogs, and instead rely on dialogs collected from past batches.

Figure 5B:
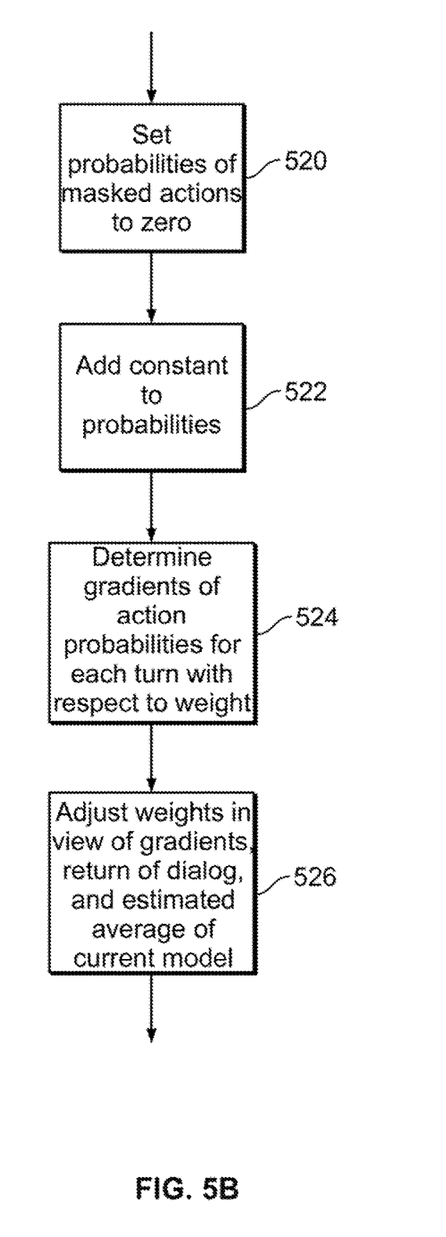
FIG. 5B is a flow diagram illustrating improvement operations for reinforcement learning operations performed by an example system; and, FIG. 6 is a simplified block diagram illustrating an example computing device.

Referring to FIG. 5B, is a flow diagram illustrating improvement operations for RL operations performed by an example system at operation 510 of FIG. 5A. At 520 the probabilities of masked actions are set to zero. At 522, a constant is added to all of the probabilities. The constant is added to prevent the logarithm and its derivative of the masked actions from being zero and undefined later in the process. The constant may be added to all action probabilities prior to taking the logarithm. This causes weights to have a zero derivative, i.e., no effect, with respect to masked actions, and other actions to be unaffected because the derivative of an additive constant is zero.

At 524, the gradients of the action probabilities for each turn with respect to weights are determined. At 526, adjustment of the weights is performed in view of gradients, the return of dialog, and the estimated average of the current model. The gradients for each dialog may be multiplied by a "step". The step may correspond to the quantity $(R\_n-B)$ where $R\_n$ is the observed return for dialog n, and B is the estimated average return of the current neural network. B may be computed by averaging $R\_n$ in the current batch, choosing a constant, or using some form of importance sampling, such as weighted importance sampling. When importance sampling is used, either the dialogs in the current batch may be used, the most recent K dialogs, or all dialogs observed to date.

When the weights have been adjusted the updated recurrent neural network is deployed as neural network 108 at operation 512 of FIG. 5A.

Performance of reinforcement learning may be periodically reported to the domain expert. Also, constraints may be added which ensure that the training dialogs in the corpus are always re-constructed. For example, if the updated neural network 10$ fails to re-generate a training dialog, then SL gradient descent can be applied on that dialog until it is re-generated.

Figure 6:
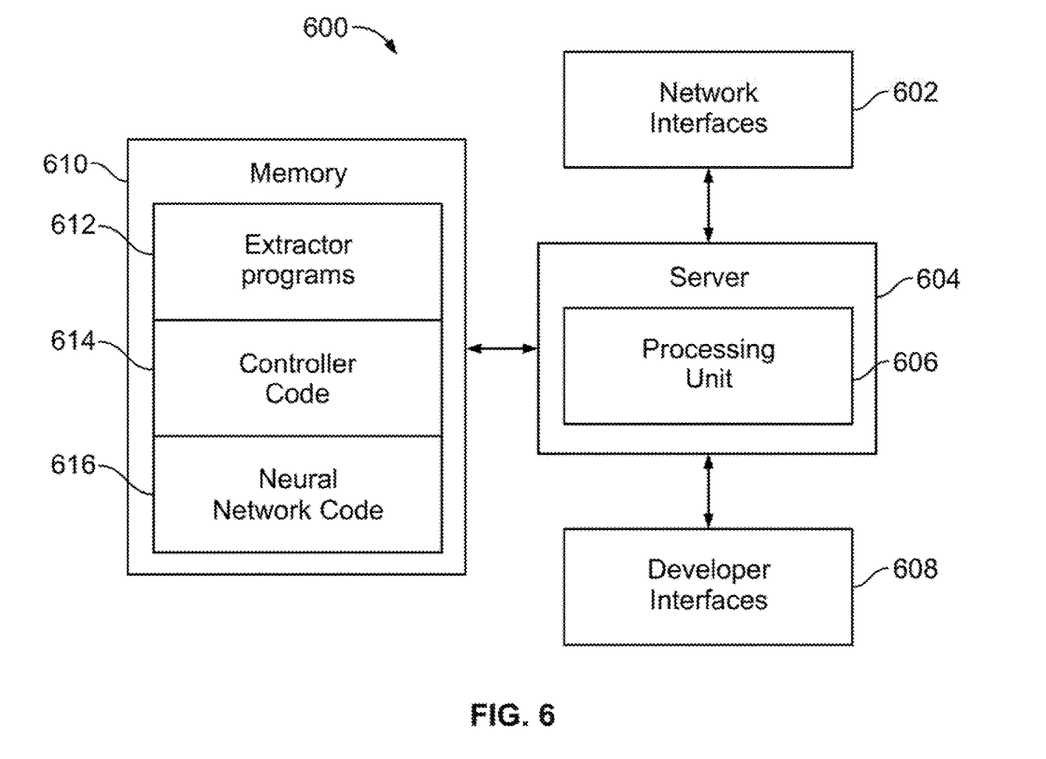

Referring now to FIG. 6, therein is a simplified block diagram of an example computing device 600. System 104 of FIG. 1 may be implemented on a device such as computing device 600. Computing device 600 may include a server 604 having processing unit 606, a memory 610, network interfaces 602, and developer interfaces 608. Memory 610 may be implemented as any type of computer readable storage media, including non-volatile and volatile memory. Memory 610 is shown as including extraction programs 612, controller code 614, and neural network code 616. Server 604 and processing unit 606 may comprise one or more processors, or other control circuitry, or any combination of processors and control circuitry. Server 604 and processing unit 606 provide overall control of computing device 600 to implement the functions of an entity extractor, recurrent neural network, and controller according to the disclosed embodiments. Computing device 600 may also be configured to provide developer interface 608 which may be configured, for example, as developer interface 112 of FIG. 1.

Developer interface 608 may be configured to allow a developer overall control of management and training of computing device 600. Developer interlace 608 may be a user interface, such as a web interface, or any other application which guides the developer. In one implementation, developer interface 608 allows the developer to enter a new dialog. As the dialog is entered, the developer interface 608 may indicate what the next system response under the current model would be, or may indicate a ranking of multiple system responses ordered by their scores. Differences between the model output and the desired output help the developer to understand the strengths and weaknesses of the current model. Another section of the developer interface 608 may allow the developer to browse through the dialogs which have been entered so far, highlighting dialogs which disagree with the current model.

Developer interface 608 may also handle entity extraction. In one implementation, the developer interface 608 may provide a pointer to an external entity extraction service. In another implementation, entity extraction labeling and refinement may be performed, for example by labeling entities using the same developer interface 608 used for entering sample dialogs.

The developer interface 608 may also allow a developer to interface computing device 600 with custom computer code. In one implementation, the custom code can be entered directly into the developer interface 608 on server 604. In another implementation, the custom code may run on a separate server, for example, on a server hosted by the developer. This latter implementation involves the developer hosting their own webserver, but provides additional control, and allows the developer to avoid disclosing the implementation of their code at the developer interface. In either alternative, example starter code may show how to structure the code and what functions to implement.

The developer interface 608 may also allow the developer to manage the RL training. The developer may specify properties of reward signals, indicate whether the RL should be active or not, view graphs of performance over time, or mange other functions of the RL training.

Additionally, the developer interface 608 may allow the developer to set configuration options. These configuration options may specify the set of API calls that are available. (The API calls may also be provided or discovered programmatically). The configuration options may also include details about the HTTP endpoint on which the bot is available, authentication and subscription options, and general administration configuration options, such as which users have access to edit the bot.

System 600 is shown as an implementation that includes server 604 as a single server for performing operations of the embodiments according to programs and code in memory 610. However, server 604 and memory 610 may be understood as representative of server functions or memory provided by one or more servers or computing devices, or storage devices, that may be co-located or geographically dispersed and that may provide the functions of the entity extraction 106, the neural network 108, and the controller 110 for other implementations of system 104. For example, the controller code may be implemented on a separate server separate from the server on which the extractor and neural network code are implemented. The term server as used in this disclosure is used generally to include any computing devices or communications equipment.

The example embodiments disclosed herein may be described in the general context of processor-executable code or instructions stored on memory that may comprise one or more computer readable storage media (e.g., tangible non-transitory computer-readable storage media such as memory 610). As should be readily understood, the terms "computer-readable storage media" or "non-transitory computer-readable media" include the media for storing of data, code and program instructions, such as memory 610, and do not include portions of the media for storing transitory propagated or modulated data communication signals.

While implementations have been disclosed and described as having functions implemented on particular computing devices, server devices, and/or wireless devices operating in a network, one or more of the described functions for the devices may be moved between the devices and implemented on a different one of the devices than shown in the figures, or on different types of equipment.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is meant to include all such implementations.

The disclosed embodiments include a system comprising one or more processors and memory in communication with the one or more processors. The memory comprises code, that when executed, causes the one or more processors to control the system to perform entity extraction on input text generated from a user input, determine marked-up text from the input text, determine a mask over available actions from the marked-up text, provide the mask and a set of features to a recurrent neural network, the set of features including the input text generated from the user input and an indication of a type of entity extracted in the entity extraction, the set of features further including, if a previous action of the system took place, at least one feature associated with the previous action, receive an indication of a selected action from the recurrent neural, update an internal state based on the indication of a selected action, and initiate the selected action. The selected action may comprise a first selected action and the first selected action comprise an application programming interface call, the set of features may comprise a first set of features, and the code may further cause the one or more processors to control the system to provide a second set of features to the recurrent neural network, the second set of features including a feature returned from the application programming interface call, receive an indication of a second selected action from the recurrent neural network, update the internal state based on the indication of the second selected action, and initiate the second selected action. The set of features may comprise a first set of features and the code may further cause the one or more processors to control the system to provide a second set of features to the recurrent neural network, the second set of features including an indication of the selected action. The at least one feature associated with the previous action may include features that are associated with actions based on a previous set of features provided to the recurrent neural network. The recurrent neural network may comprise a long short term memory neural network, a standard recurrent neural network, or any other neural network or machine learning method capable of inferring a representation of state given a sequence of past observations. Also, the code may control the system to initiate the selected action by controlling the one or more processors to control the system to determine that the selected action includes one or more entity references, populate the one or more entity references, and initiate the selected action based on the populated references.

The disclosed embodiments also include method comprising performing entity extraction on input text received from a user input, determining marked-up text from the input text, determining a mask over available actions from the marked-up text, providing the mask and a set of features to a recurrent neural network, the set of features including the input text received from the user input and an indication of a type of entity extracted in the entity extraction, the set of features further including, if a previous action of the system took place, at least one feature associated with the previous action, receiving an indication of a selected action from the recurrent neural network, updating an internal state based on the indication of a selected action, and initiating the selected action. The selected action may comprise a first selected action and the first selected action may comprise an application programming interface call, the set of features may comprise a first set of features, and the method may further comprise providing a second set of features to the recurrent neural network, the second set of features including a feature returned from the application programming interface call, receiving an indication of a second selected action from the recurrent neural network, updating the internal state based on the indication of the second selected action, and initiating the second selected action. The set of features may comprise a first set of features and the method may further comprises providing a second set of features to the recurrent neural network, the second set of features including an indication of the selected action. The at least one feature associated with the previous action may include features that are associated with actions based on a previous set of features provided to the recurrent neural network. The recurrent neural network comprises a long short term memory neural network. The initiating the selected action may comprise determining that the selected action includes one or more entity references, populating the one or more entity references, and initiating the selected action based at least in part on the populated references.

The disclosed embodiments also include a system comprising one or more processors and memory in communication with the one or more processors. The memory may comprise code, that when executed, causes the one or more processors to control the system to receive one or more sample dialogs, determine if any action in the one or more sample dialogs is masked out, and, in response to a determination that no action in the one or more sample dialogs is masked out, incorporate the one or more sample dialogs into a training set, create a log including a set of features and entity extractions, apply training using the training set and the log in a recurrent neural network, score the one or more sample dialogs using the recurrent neural network to generate a score result based on the training, and determine if a target action in the one or more sample dialogs was not assigned a highest probability in the score result. The code may further cause the one or more processors to control the system to provide, in response to a determination that a target action in the one or more sample dialogs was not assigned a highest probability in the score result, an indication of a dialog of the one or more sample dialogs in which the target action was not assigned a highest probability. The code further causes the one or more processors to control the system to provide, in response to a determination that each target action in the one or more sample dialogs was assigned a highest probability in the score result, an indication that the one or more sample dialogs were reconstructed successfully. The code further causes the one or more processors to control the system to provide, in response to a determination that an action in the one or more sample dialogs is masked out, an indication of the action in the one or more sample dialogs that is masked out at a user output.

The disclosed embodiments also include a system comprising one or more processors and memory in communication with the one or more processors. The memory may comprise code, that when executed, causes the one or more processors to control the system to receive a definition for a reward signal and a return for one or more dialogs, perform the one or more dialogs using a recurrent neural network, create a log including rewards, features, available actions, and actions for the performed one or more dialogs, provide the rewards for the performed one or more dialogs to the neural network for use in improvement of the neural network, and provide the log for output at a user interface. The reward signal may be a real valued number indicating a quality of a system action at each of a plurality of turns of the one or more dialogs for a selected context and the return is a discounted sum of the rewards at each turn of the one or more dialogs. The one or more dialogs may comprise a first one or more dialogs, the log may comprise a first log, and the code further may causes the one or more processors to control the system to perform a second one or more dialogs using the recurrent neural network subsequent to providing the return for the performed first one or more dialogs, create a second log including rewards, features, available actions, and actions for the performed second one or more dialogs, and provide the rewards for the performed second one or more dialogs to the neural network based on the second log for use in improvement of the neural network. The code may further cause the one or more processors to control the recurrent neural network to set an action probability of each masked action to zero, add a constant to an action probability of each available action and the action probability of each masked action, determine a gradient of each of the action probabilities for each turn of dialog with respect to a weight of the action probability, and adjust the weight of each of the action probabilities in view of its gradient, the return of the one or more dialogs, and an estimated average of the current model.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A system comprising:

one or more processors; and, memory in communication with the one or more processors, the memory comprising code, that when executed, causes the one or more processors to control the system to:

determine marked-up text from an input text, wherein the marked-up text associates portions of the input text with corresponding entities identified in the text;

identify available actions, from among a plurality of available actions based on the identified entities in the input text;

provide the identified available actions and a set of features to a recurrent neural network, the set of features including at least one feature associated with a previous action if the previous action took place;

receive an indication of a selected action from the recurrent neural network;

update an internal state based on the indication of a selected action; and, initiate the selected action, including one of generating textual output, invoking an application programming interface (API) call, receiving input from a user, and quitting an interaction with the user.

2. The system of claim 1, wherein the set of features includes the input text.

3. The system of claim 1, wherein the code further causes the one or more processors to perform entity extraction on the input text and the set of features includes an indication of a type of entity extracted from the input text.

4. The system of claim 1, wherein the code further causes the one or more processors to perform entity extraction on the input text and the set of features includes the input text and an indication of a type of entity extracted from the input text.

5. The system of claim 1, wherein the selected action comprises a first selected action and the first selected action comprises an application programming interface call, the set of features comprises a first set of features, and the code further causes the one or more processors to control the system to:

provide a second set of features to the recurrent neural network, the second set of features including a feature returned from the application programming interface call;

receive an indication of a second selected action from the recurrent neural network;

update the internal state based on the indication of the second selected action; and, initiate the second selected action.

6. The system of claim 1, wherein the set of features comprises a first set of features and the code further causes the one or more processors to control the system to:

provide a second set of features to the recurrent neural network, the second set of features including an indication of the selected action.

7. The system of claim 1, wherein the at least one feature associated with the previous action includes features that are associated with actions based on a previous set of features provided to the recurrent neural network.

8. The system of claim 1, wherein the recurrent neural network comprises a long short term memory neural network.

9. The system of claim 1, wherein the code controls the system to initiate the selected action by controlling the one or more processors to control the system to:

determine that the selected action includes one or more entity references;

populate the one or more entity references; and, initiate the selected action based on the populated references.

10. A method comprising:

determining marked-up text from an input text, wherein the marked-up text associates portions of the input text with corresponding entities identified in the text;

identifying available actions, from among a plurality of available actions based on the identified entities in the input text;

providing the identified available actions and a set of features to a recurrent neural network, the set of features including at least one feature associated with a previous action if the previous action took place;

receiving an indication of a selected action from the recurrent neural network;

updating an internal state based on the indication of a selected action; and, initiating the selected action, including one of generating textual output, invoking an application programming interface (API) call, receiving input from a user, and quitting an interaction with the user.

11. The method of claim 10, wherein the set of features includes the input text.

12. The method of claim 10, wherein the method further comprises performing entity extraction on the input text and the set of features includes an indication of a type of entity extracted from the input text.

13. The method of claim 10, wherein the method further comprises performing entity extraction on the input text and the set of features includes the input text and an indication of a type of entity extracted from the input text.

14. The method of claim 10, wherein the selected action comprises a first selected action and the first selected action comprises an application programming interface call, the set of features comprises a first set of features, and the method further comprises:

providing a second set of features to the recurrent neural network, the second set of features including a feature returned from the application programming interface call;

receiving an indication of a second selected action from the recurrent neural network;

updating the internal state based on the indication of the second selected action; and, initiating the second selected action.

15. The method of claim 10, wherein the set of features comprises a first set of features and the method further comprises:

providing a second set of features to the recurrent neural network, the second set of features including an indication of the selected action.

16. The method of claim 10, wherein the at least one feature associated with the previous action includes features that are associated with actions based on a previous set of features provided to the recurrent neural network.

17. The method of claim 10, wherein the recurrent neural network comprises a long short term memory neural network.

18. The method of claim 10, wherein the initiating the selected action comprises:

determining that the selected action includes one or more entity references;

populating the one or more entity references; and, initiating the selected action based at least in part on the populated references.

19. A system comprising:

one or more processors; and, memory in communication with the one or more processors, the memory comprising code, that when executed, causes the one or more processors to control the system to:

receive one or more sample dialogs;

determine if any action among a plurality of actions does not correspond to any entity among the one or more sample dialogs; and in response to a determination that every action in the plurality of actions corresponds to an entity among the one or more sample dialogs:

incorporate all of the one or more sample dialogs into a training set;

create a log including a set of features and entity extractions;

apply training using the training set and the log in a recurrent neural network;

score the one or more sample dialogs using the recurrent neural network to generate a score result based on the training; and, determine if a target action in the one or more sample dialogs was not assigned a highest probability in the score result.

20. The system of claim 19, wherein the code further causes the one or more processors to control the system to:

provide, in response to a determination that a target action in the one or more sample dialogs was not assigned a highest probability in the score result, an indication of a dialog of the one or more sample dialogs in which the target action was not assigned a highest probability.

21. The system of claim 19, wherein the code further causes the one or more processors to control the system to:

provide, in response to a determination that each target action in the one or more sample dialogs was assigned a highest probability in the score result, an indication that the one or more sample dialogs were reconstructed successfully.

22. The system of claim 19, wherein the code further causes the one or more processors to control the system to:

provide, in response to a determination that an action does not correspond to any entity among the one or more sample dialogs, an indication at a user output that the action does not correspond to any entity among the one or more sample dialogs.

\* \* \* \* \*